US008209205B1

(12) United States Patent (10) Patent No.: US 8,209,205 B1
McElroy et al. (45) Date of Patent: Jun. 26, 2012

(54) PLANNING AND SCHEDULING TOOL ASSISTANT ASSURING HIGH UTILIZATION OF RESOURCES

(75) Inventors: John W. McElroy, Newtown Square, PA (US); Sean P. McElroy, Draper, UT (US); Kirk Samsel, Denver, CO (US)

(73) Assignee: John W. McElroy, Newtown Square, PA (US)

( * ) Notice: Subject to any disclaimer, the term of this patent is extended or adjusted under 35 U.S.C. 154(b) by 2847 days.

(21) Appl. No.: 10/851,663

(22) Filed: May 24, 2004

Related U.S. Application Data

(60) Provisional application No. 60/472,414, filed on May 22, 2003, provisional application No. 60/483,111, filed on Jun. 30, 2003.

(51) Int. Cl.
*G06Q 10/00* (2006.01)
*G06F 19/00* (2006.01)
(52) U.S. Cl. ...................................... 705/7.12; 700/100
(58) Field of Classification Search ................. 705/7.12; 717/102; 700/100
See application file for complete search history.

(56) References Cited

U.S. PATENT DOCUMENTS

| | | | |
|---|---|---|---|
| 5,787,000 A | 7/1998 | Lilly et al. | |
| 5,835,898 A | 11/1998 | Borg et al. | |
| 5,970,437 A | 10/1999 | Gorman et al. | |
| 6,006,171 A | 12/1999 | Vines et al. | |
| 6,421,571 B1 | 7/2002 | Spriggs et al. | |
| 7,210,119 B2 * | 4/2007 | Pothos et al. | 717/102 |
| 7,225,040 B2 * | 5/2007 | Eller et al. | 700/100 |
| 2002/0007297 A1 | 1/2002 | Clarke | |
| 2002/0010615 A1 | 1/2002 | Jacobs | |
| 2002/0049563 A1 | 4/2002 | Vetter et al. | |
| 2002/0111842 A1 | 8/2002 | Miles | |
| 2002/0143601 A1 | 10/2002 | Sinex | |
| 2002/0161674 A1 | 10/2002 | Scheer | |
| 2003/0041087 A1 | 2/2003 | Pothos et al. | |

FOREIGN PATENT DOCUMENTS

WO WO 99/05684 2/1999

OTHER PUBLICATIONS

Chatfield, Carl, and Timothy Johnson. Step by Step Microsoft Office Project 2003. Microsoft P, 2003.*
A., Silver, Edward. Inventory management and production planning and scheduling. New York: Wiley, 1998.*

* cited by examiner

*Primary Examiner* — Beth V Boswell
*Assistant Examiner* — Folashade Anderson
(74) *Attorney, Agent, or Firm* — Blank Rome LLP

(57) ABSTRACT

Schedulers, Planners, and Maintenance Supervisors in an Industrial facility can use the user interface of the present invention to extremely quickly move work order schedules, status planning, and manage resources. Additionally, key performance indicators or metrics on performance on how well the organization is doing is also cumbersome if not impossible in the current practice in these industrial organizations. The variables of this management include worker, crew, Work Order, Dates, Planning Status, planner, dates, etc. (see tech manual and summary sheets). The invention operates by interfacing with the Computerized Maintenance Management System (CMMS) database in a thoroughly interactive process. The local program constructs a parallel database and reads and feedbacks to the CMMS database frequently to stay current and accurate.

20 Claims, 4 Drawing Sheets

PLANNING AND SCHEDULING TOOL ASSISTANT ASSURING HIGH UTILIZATION OF RESOURCES

REFERENCE TO RELATED APPLICATIONS

The present application claims the benefit of U.S. Provisional Application Nos. 60/472,414, filed May 22, 2003, and 60/483,111, filed Jun. 30, 2003, whose disclosures are hereby incorporated by reference in their entireties into the present disclosure.

FIELD OF THE INVENTION

The present invention is directed to a computerized planning and scheduling system and more particularly to such a system for increasing efficiency in industrial environments.

DESCRIPTION OF RELATED ART

Industrial Assets, such as plant equipment or major equipment, require maintenance from time to time to repair broken components, perform preventive tasks to minimize failures, and to replace worn out equipment. The discrete nature of this work—repair this pump, lubricate that motor—is controlled at most, if not all, industrial sites with some work management system or CMMS (Computerized Maintenance Management System). The discrete piece of work is identified in the CMMS as a Work Order (WO) (eg: Work Order to repair pump.) At most industrial sites the number of work orders generated per week can be large. These work orders must be laid out in a schedule for the limited maintenance resources in an efficient manner so that the WO can be planned and may be completed with little wasted effort.

Most CMMS systems will allow Work Orders to be assigned schedule dates for intended completion. In order to do this, various navigation schemes must be executed through the software and manual typing must be done. This method of attempted scheduling and planning is tedious and cumbersome for those folks in the industrial facility charged with scheduling and accomplishing the work.

In these days of highly limited resources (manpower), there should be little tolerance of wasted and inefficient tasking. The scheduling and planning tools must be extremely easy to use and require little time to manipulate assignments and make changes to the schedule and planned status of all the work orders and all the maintenance resources.

The following references are related to the general field of the present invention. Their pertinence will be discussed below.

| PATENT OR PUBLICATION NO. (U.S. unless otherwise specified) | INVENTOR(S) |
| --- | --- |
| 6,421,571 B1 | Spriggs, et al. |
| 6,006,171 | Vines, et al. |
| 5,970,437 | Gorman, et al. |
| 5,835,898 | Borg, et al. |
| 5,787,000 | Lilly, et al. |
| 2003/0041087 A1 | Pothos, et al. |
| 2002/0161674 A1 | Scheer |
| 2002/0143601 A1 | Sinex |
| 2002/0111842 A1 | Miles |
| 2002/0049563 A1 | Vetter, et al. |
| 2002/0010615 A1 | Jacobs |
| 2002/0007297 A1 | Clarke |
| WO 99/05684 | Vines, et al. |

SUMMARY OF THE INVENTION

It is an object of the invention to overcome the above-noted deficiencies of the prior art. It is a further object of the invention to provide the following advantages:

A. for the process of Work Week Management where the schedule of work is managed to the week.
B. Real Time, on screen, performance indicators or metrics for the success of the Work Week
C. Drag and Drop Work Orders into a designated Work Week
D. Color coding Work Order status within the Work Week
E. Throttle control of Sponsored work
F. Work Week Assignment Form and Work Week Management Form—key screens To achieve the above and other objects, the present invention is directed to a planning and scheduling tool assistant (PaSTA) designed for the Schedulers, Planners, and Maintenance Supervisors in an Industrial facility to extremely quickly move work order schedules, status planning, and manage resources for optimum utilization.

Additionally, key performance indicators or metrics on performance on how well the organization is doing is also cumbersome if not impossible in the current practice in these industrial organizations. PaSTA is designed to provide those key performance indicators simply and automatically.

PaSTA is also designed to throttle the very inefficient and ineffective "sponsored" work that enters the work schedule at the last minute and enters with no planning of the work completed.

The variables of this management include worker, crew, Work Order, Dates, Planning Status, planner, dates, etc. (see tech manual and summary sheets).

PaSTA operates by interfacing with the CMMS database in a thoroughly interactive process. PaSTA constructs a parallel database and reads and feedbacks to the CMMS database frequently to stay current and accurate. For most users of PaSTA, they will not perceive that they are using anything else but the CMMS database. Typically, although not necessarily, the user will run PaSTA on a networked computer, likely one running Windows, and will use PaSTA as a front end to a CMMS database on a remote server.

The present invention offers the following features:

1. Drag and drop movement of work orders from work-week to work-week, from unscheduled to scheduled, to short notice outage plan, to planned outage plan, to backlog. Because the screen has side by side unscheduled and multiple weeks presented, it is very easy to drag and drop work into any given week or to the holding buckets of short notice outage plan, planned outage plan, and backlog. When work orders are dropped into a given work-week, real time indication of resource loading are visible so that the scheduler will know they have not overloaded the work group with too much work.

2. Color coding based on status of planning the work order. That is, the determination of whether the work order is ready to work and is fully planned. For instance, a green background will indicate that the work order is complete and ready to work (e.g., parts are available, operations clearance requirements are set, interactions with other groups has been identified and planned, etc.). A yellow background indicates that a planner assigned and planning underway. Pink indicates no planner is assigned, and planning is not started. Red indicates emergency work and blue indicates sponsored work.

3. Throttle control of sponsored work, which is the highly disruptive work created and entered into a completely planned week of work (i.e., actually sponsored into getting done by somebody at the site requesting it get done now). This is very inefficient work for resources to be dedicated to and must be minimized. The assistant tracks and throttles those events by immediately flagging them, holding the organization accountable to it, and generates a real time key performance indicator.

4. Real Time Automated Metrics are provided. These key performance indicators are immediately available to users to track critical performance criteria in execution of work. These metrics are completely automated on the same screens as the work schedule is presented. Full automation and filtering of the data allows management to see group, department, and organization wide performance on any combination of over 20 different performance indicators over any time period with the click of the mouse.

5. Two basic screen formats are critically designed. One screen (Work Week Assignment Tool) is for the scheduling and planning activities by the schedulers and planners. The second screen (Work Week Management Form) is for the maintenance supervisor to execute the work week.

The advantages that the present invention offers over the above-cited prior art will now be considered.

Borg, et al:

Borg discloses manufacturing scheduling where drag and drop feature applies to work area and open time line—spatial and then determines bottlenecks in manufacturing process. Key here is the real time indication of that bottleneck—not particularly measuring the performance of a schedule. The manufacturing process is not start and stop process but a continuous process and the concepts of work week management are not applicable In the present invention, drag and drop allows Work Orders to be assigned into a scheduled work week where the intent is to measure the performance of the work team executing the work week. Work Week Management infers that there is a start and stop to the collective work being performed. A thru F still are distinguished—although C becomes constrained to work week management.

Vines, et al:

Vines discloses a maintenance management that couples a Work Order Generation system with a Process Control System. The intent here is to automatically generate a Work Order based on the condition of the components being monitored by the Process Control System. There is no scheduling function other than in the creation of the work order a desired due date is required based on predetermined intervals. Management of the labor force is not part of the disclosure In the present invention, all elements of A thru F are unique as PaSTA begins at the point in the process that the Work Order has already been created, where Vines, et al stop—the creation of the Work Order.

Spriggs, et al:

Spriggs discloses an online monitoring system intended to monitor the process condition of components. It is not a work management system In the present invention, elements A thru F are unique in that we disclose a work management system.

Gorman, et al:

Gorman discloses a system designed to show the relation of components in an operating environment. The intent is to recognize the interrelationship of these components as maintenance work is being performed. This knowledge is used to properly isolate the equipment so that it can be worked on safely and the interrelationship understood.

In the present invention, all elements A thru F are unique in that we disclose a work management system.

Lilly, et al:

Lilly discloses a Work Order Management system that provides for each work order to be planned. That is all necessary resources to accomplish the work are prescribed and documented in the disclosed system. A desired start date and desired finish date are entered also.

In the present invention, all elements A thru F are unique in that we are scheduling the work against a work week and against the available labor resource and measuring key performance parameters to drive the schedule. The closest piece here is in our D where we are statusing the planning of the work orders with color coding which Lilly does not do.

Pothos, et al:

Pothos discloses a system to intended to manage maintenance resources spatially—across a wide territory and to optimize the work in sequence against location of work. A Gaant chart is the result for each labor resource showing the optimized sequence of work for that single resource.

In the present invnetion, all elements A thru F are unique in that we are getting work orders optimized in a work week management timing sequence. Work Orders are dragged and dropped into a work week and then schedule performance is measured. Sponsored work is throttled.

Scheer, et al.

Scheer discloses a system for supply chain management with the intent of optimizing a just in time inventory system for repair parts.

In the present invention, all elements A thru F are unique in that we disclose a work management system.

Sinex, et al

Sinex discloses a system that assigns work to a qualified work person. This assures that quality work will be performed and that an auditable documentation is available to prove workers are qualified to perform the repairs assigned.

In the present invention, all elements A thru F are unique in that we disclose a work management system that assigns work orders into a work week for a group of resources and then measures the effectiveness of the group's work week schedule thus creating work week management.

Miles, et al:

Miles discloses a system of work order management intended to create access for customers and vendors so that control of work at the user site, customer site, and vendor site is all coordinated. This system meets the need for integrated resource management with a work order.

In the present invention, all elements A thru F are unique in that we disclose a work management system that assigns work orders into a work group of resources and then measures the effectiveness of the group's work week schedule thus creating work week management.

Jacobs, et al:

Jacobs discloses a system intended to control the work of a mobile workforce and optimize the work assuring qualified workers are assigned and optimizing the sequence work based on location. This patent appears to have overlap with Pothos and Sinex.

In the present invention, all elements A thru F are unique in that we disclose a work management system that assigns work orders into a work group of resources and then measures the effectiveness of the group's work week schedule thus creating work week management.

Clarke, et al:

Clarke discloses a system intended to manage work orders against available resources. The system requires manual entry to manage that balance between work and resource. The system performs identical functions of many commercially available work management systems.

In the present invention, all elements A thru F are unique in that we disclose a work management system whose goal is similar to Clarke but performs uniquely. The functions that are unique are those delineated in A thru F.

Vetter, et al:

Vetter discloses a system for work management intended to optimize operating equipment while other equipment can be maintained. The approach is to isolate the equipment to be worked on while minimizing the impact on the entire operating system which the equipment being worked on is part.

In the present invention, all elements A thru F are unique in that we disclose a work management system that assigns work orders into a work group of resources and then measures the effectiveness of the group's work week schedule thus creating work week management.

BRIEF DESCRIPTION OF THE DRAWINGS

A preferred embodiment of the present invention will be set forth in detail with reference to the drawings, in which:

FIG. 2 is an annotated screen shot showing the work week assignment tool with work orders coded;

FIG. 3 is a screen shot of a work week management form; and

FIG. 4 is a screen shot of the work week management form with a display of a graph.

DETAILED DESCRIPTION OF THE PREFERRED EMBODIMENT

Figure 1:
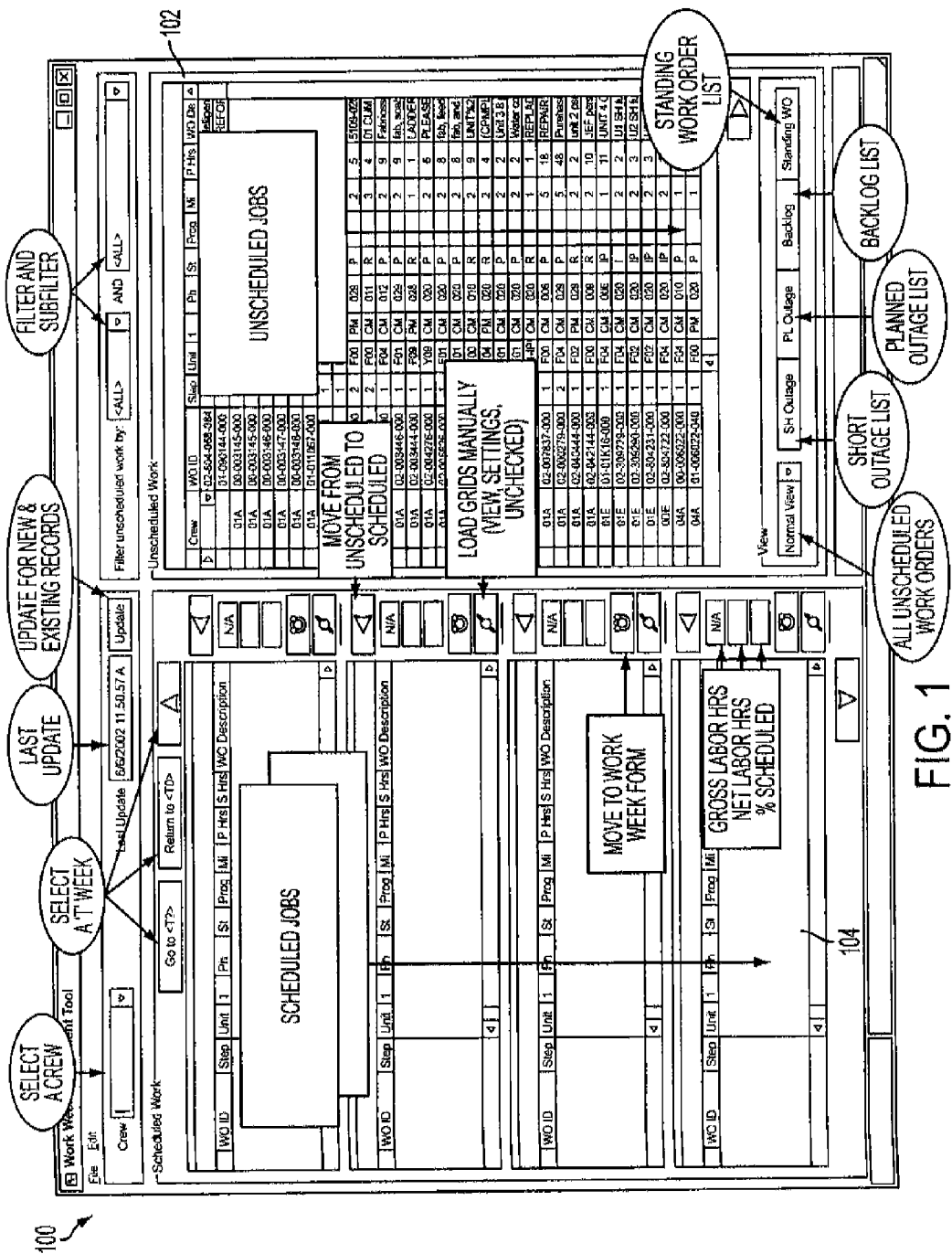
FIG. 1 is an annotated screen shot showing a work week assignment tool according to the preferred embodiment.

A preferred embodiment of the present invention will be set forth in detail with reference to the drawings, in which like reference numerals refer to like elements or steps throughout.

Five key aspects of the preferred embodiment will be described with reference to FIGS. 1-4. The combination of the five key aspects is considered to be a sixth key aspect.

The first key aspect is the ability to assign work orders to a work week (or other suitable unit of time) by drag-and-drop. FIG. 1 shows an annotated screen shot of a work week assignment tool 100. On the right is a list 102 of unscheduled jobs. On the left is a list 104 of scheduled jobs, grouped by work week. Using the work week assignment tool, a user can easily click on an unscheduled job with a mouse and drag it to a desired work week.

Figure 2:
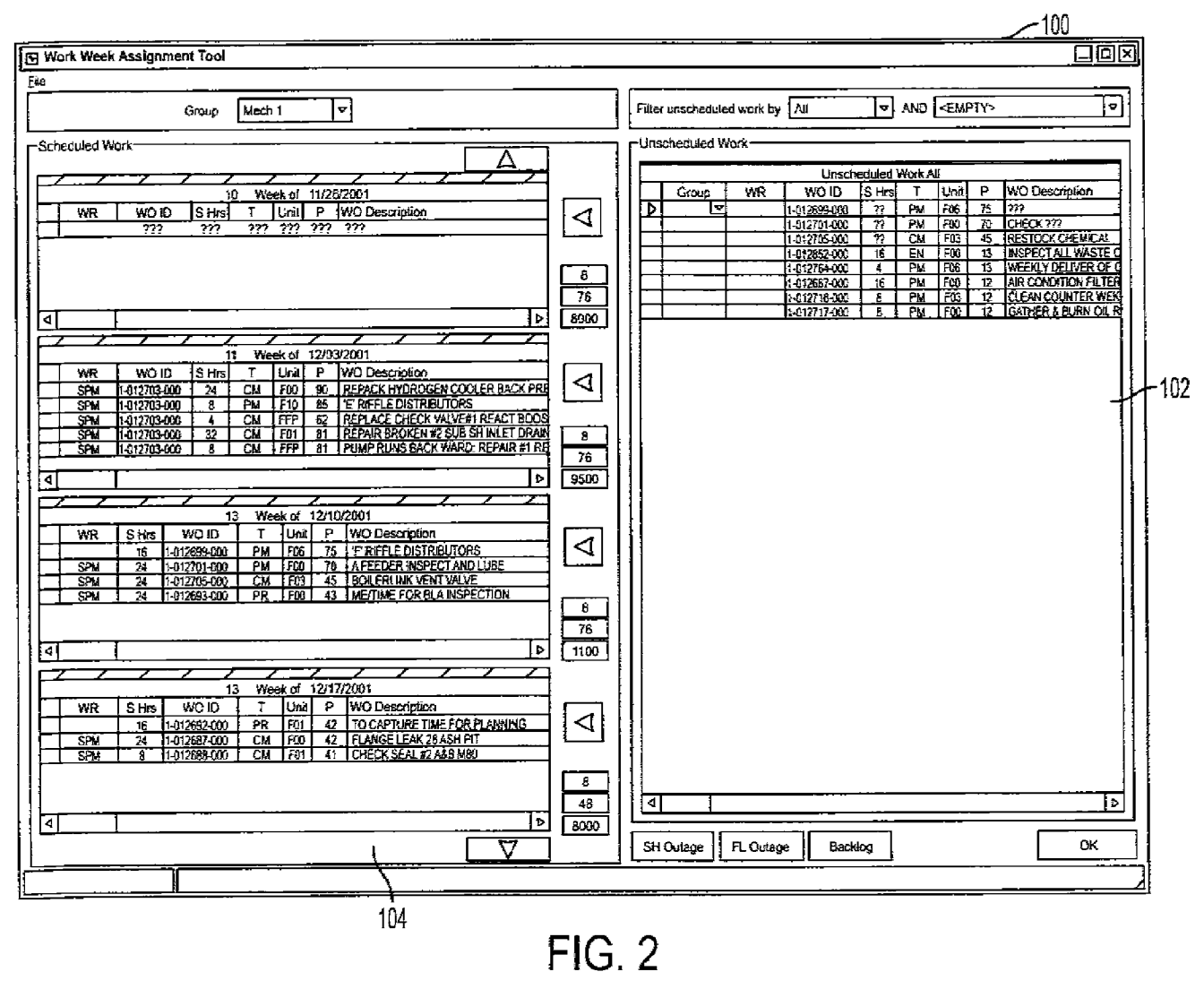

The second key aspect of coding (e.g., color coding) of the status of planning of each work order. FIG. 2 shows a screen shot of the work week assignment tool 100 with the work orders color coded. The color codes can be assigned in any suitable manner, of which the following is an illustrative example: pink=no planner is assigned and planning not started; yellow=planner assigned, planning underway; and green=planning complete, work order ready to work.

Figure 3:
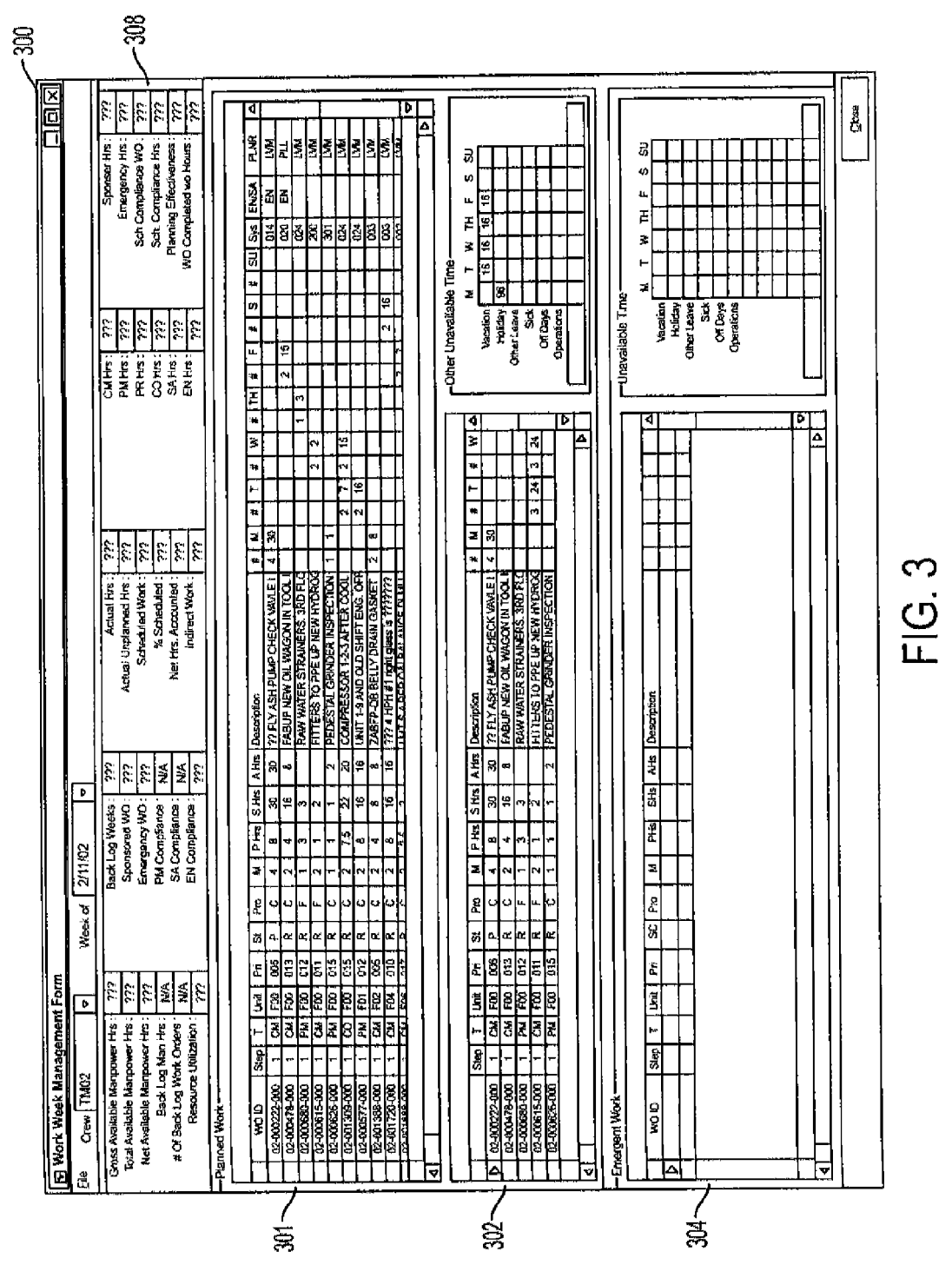

The third key aspect is throttle control of sponsored work. FIG. 3 shows a screen shot of a work week management form 300, which includes a planned work pane 301, an indirected work pane 302, and an emergent work pane 304. In the emergent work pane 304, a work order 306 is color coded (e.g., dark blue) to identify it as sponsored work—anyone creating sponsored work must sign their name to that sponsoring.

Figure 4:
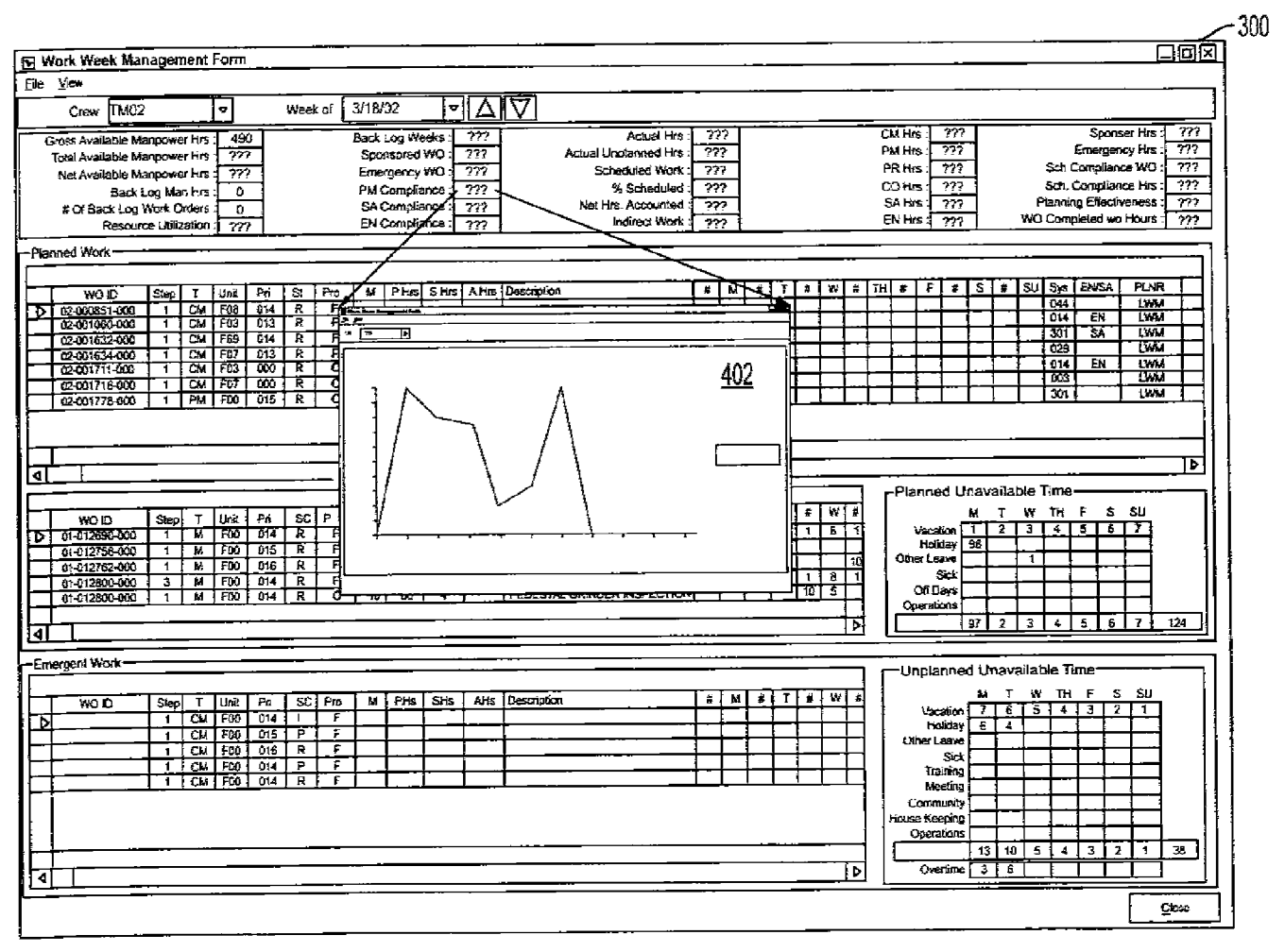

The fourth key aspect is real-time automated metrics. The work week management form 300 of FIG. 3 includes an area 308 listing key performance indicators or metrics and a real-time value of each. As shown in FIG. 4, clicking on any of the metrics results in the display of a graph 402 of the metric to the user.

The fifth key aspect is the provision of two basic screen formats critically designed—one for the scheduling and planning activities by the "schedulers and planners" (Work Week Assignment Tool 100)—and second for the maintenance supervisor to execute the work week (Work Week Management Form 300).

Details of the operation of PaSTA will now be disclosed.

PaSTA creates the discipline driving the best practice process of work-week management. In addition the organization's planning and scheduling efforts will reap great benefits around: rhythm, budgets, morale, cost etc.

As shown in FIG. 1, the work week assignment tool includes the following functionality:

Crew: Allows user to select a desired crew

Week of: Allows user to select the desired week with the arrow or a drop down calendar. The weeks are designated T0, T1, . . . .

Planned Unavailable Time This area is used for hours that are not tracked on work orders (WO), i.e. vacation, holiday, sick leave, off days, operations, etc.

Unplanned Unavailable Time This area is used for hours that occurred during T0 that were not scheduled, i.e. training, meetings, emergency vacation, etc.

The PaSTA program is started in the normal way for the operating system. For example, in Windows, the user can double-click a screen shortcut or use the "Start" button. Enter user name (This is set by PaSTA system administrator. This can be anything, suggest using your system log on name). Enter Password (This can be anything, it will never change. If this is a first time login into PaSTA you will be asked to confirm your password.)

The next screen to appear is the Front Page: (single click on the parse to go to the desired screen. To exit the program click on 'x' in the upper right corner or File—exit.)

Work Week Management Assignment:
Schedule, unscheduled work
Reschedule, scheduled work
Unschedule work
Search for work orders
Schedule for different crews
Sort and edit work orders
Review schedule, unscheduled work by unit and system Work Week Management:
View a crew's work week
View a work week by system and unit
Reschedule work
Unschedule work
Search for work orders
Shift work to a different crew
Sort and edit work orders
Set daily schedule
Set indirect work
Manage emergent work and unplanned, unavailable time
Export a Schedule:
Export to Primavera Management Reports:
Reports, charts and trends are accessed
Administration:
Only administrators have access to this area. This area allows the administrator to:
1. Set up users
2. Edit interfaces
Update: allows level 3 users to update PaSTA
Update Labor Hours: allows level 3 users to update all the actual hour. Three possible scenarios:
1. WOs (work orders) scheduled in T(0) are populated with hours
2. WOs not scheduled in T(0) or unscheduled are copied into T0 as sponsored work, sponsored by and labor update. The WO(s) will remain in their original schedule or unscheduled location.
3. WOs not in PaSTA will be placed on an exceptions list.
View Exceptions List: Displays all WOs not in PaSTA that had hours charged to them during T0
1. How to Schedule Work into T(?) Weeks
Log onto PaSTA and click on the Work Week Assignment Tool:
1.1 Update
Look in the 'Last Updated' window. If PaSTA has not been recently updated click on the 'Update' button. You will be asked if you want to import new records, YES. This process may take several minutes, depending on the number of records to be imported. The counter on the lower left of the screen will tell you how many records have been imported and the total to be imported.
1.2 Choosing a Crew/Unit/System to Modify
First choose the crew, unit or system from the drop down list, located on the top left side of the screen
Then filter by: All, current crew or date initiated, located top right side, left drop down
Then, if desired, sub filter by: All, Planner Assigned and Ready, Planner Assigned and Not Ready, No Planner Assigned or Status=C (complete)
1.3 Scheduling Work into T(?) Weeks
Choose a work order by left clicking on it and dragging it to the desired week.
Note: Holding down the shift key while dragging a work order is the same as using the 'copy to' function
Or
Left click on the work order, then right click and choose from the menu to either 'move to' or 'copy to'
'move to' will move the work order from one 'grid' to another
'copy to' will leave the work order in the originating 'grid' and also place it into T week desired
1.4 View Scheduled Work on the Work Week Management Form
Left click on the 'work week management form'
1.5 Work Week Management Form
1.5.1 Indirect Work Area
First, fill in the 'Indirect Work' and 'Planned Unavailable Time'. This will set the total net hours available to schedule.
Type in the total hours that will not be available during the week, by day
Schedule indirect work orders (IM) by placing the daily IM hours into the corresponding days of the week
Note: The '#' sign before each day of the week is the total number of resources to be used that day for that particular work order. The hours placed under the days of the week are total duration hours for the day.

1.5.2 Planned Area
Fill in the scheduled hour for each work order (total duration hours per day)
Review all work orders to ensure that they are complete and properly coded
Ensure that Planned Hours (P Hrs) are correct
The foremen provide the days of the week and work hours to the coordinator in order to build the schedule.
Note: The '#' sign before each day of the week is the total number of resources to be used that day for that particular work order. The hours placed under the days of the week are total duration hours for the day.
1.5.3 Metrics
This area displays leading metrics.
1. Ensure that the number of 'Gross Available Manpower Hrs' is correct (the number of resources in a crew times the number of hours in a week, e.g. 10 resources×40 hours=400 gross available hours)
2. Once a week, input the 'Back Log Man Hrs' and '# Of Back Log Work Orders'. This should be done at the same time each week, Friday morning before the Friday work control meeting.
2. How to Update to Week
2.1 Emergent Work (Emergency-Sponsored) Work Week Assignment Tool
To place emergent work into week T0 start on the 'Work Week Assignment Form'. Drag the desired work order from the unscheduled side (right side) or from a (T?) week into the T0-week. When this happens a message box will appear asking you to set the work order to either emergency work (E) or sponsored work (S) and enter the name of the person requesting the work.
Emergency (E) work is coded red and sponsored (S) work is coded blue
2.2 Emergent Work (Emergency-Sponsored) Work Week Management Form
2.2.1 Emergency and Sponsored Work
After emergent work has been added to T0 it will be placed into the 'Emergent Work' section of the Work Week Management Form.
2.2.2 Unplanned Unavailable Time
It is necessary to identify all hours, during T0, that were unplanned and place them in the 'Unplanned Unavailable Time' section.
The total amount of overtime accrued during the week will to be entered into the 'Overtime' section during the labor update.
Note: It is important that progress, 'Prog', is captured for each WO. The '#' sign before each day of the week is the total number of resources to be used that day for that particular work order. The hours placed under the days of the week are total duration hours for that day.
2.3 Planned Work Area Updating:
Actual hours (A Hrs) include straight time and over time will be updated via the labor update.
8 hrs of straight time and 2 hrs of over time=10 actual hours worked
Note: Ensure that all actual hours (A Hrs) are accurate and complete
Ensure that the progress (Prog) for each work order is accurate.
C (complete)=all work planned for the week is complete. This does not have to mean that the job is complete or that the work order is closed in the CMMS
R (rolled)=a job that was not worked or completed and had to be rolled to another week.

A 'C' will be placed in the Prog if the WO was closed during T0

Note: Once you have set the schedule for the work week do not readjust the scheduled hours (you can move the hours to a different day but, this in is not recommended). The foremen are responsible for the T0 schedule. The foremen are responsible for all work on the schedule and updating the coordinators with actual hours and whether work is complete or rolled to another week.

3. Metrics and Trend Charts 3.1 Metrics Definitions:

Gross Available Manpower Hrs=
  # of craft in the crew (excluding the foreman)×8 hrs per day×5 days per week Total Unavailable Manpower Hrs=
  "IM" (Indirect Maintenance)+the planned unavailable time Net Available Manpower Hrs=
  Gross available manpower hrs−total available manpower hrs Backlog Man Hours=
  Current open backlog work order man hrs (excluding annual and maintenance shutdown hours)

Of Backlog Work Orders=
  Current open backlog work order count for the crew (excluding annual and maintenance outage work orders)

Resource Utilization=
  [Actual hrs charged (includes OT)+emergent hrs]/[Gross available man hrs+unplanned overtime]

Backlog Weeks=
  Backlog man hrs/Gross available manpower hrs

Sponsored WO=
  Total number of sponsored (S) work orders

PM Compliance (%)=
  # of completed PM work orders (Prog=C)/# of scheduled PM's work orders SA Compliance=
  # of completed SA work orders (Prog=C)/# of scheduled SA work orders EN Compliance=
  # of completed EN work orders (Prog=C)/# of scheduled EN work orders Actual Hrs=
  Total 'Planned Work' actual hours (straight time and overtime hours) that have been charged to scheduled work Actual Unplanned Hrs=
  Total hrs (straight time and overtime) charged to 'Emergent Work'+'Unplanned Unavailable time'

Scheduled Work=
  Total scheduled hrs for 'Planned Work' for the week

% Scheduled=
  Total scheduled hrs, for the week/Net available man hrs, for the week Net Hrs Accounted=
  [Actual hrs (scheduled work+IM's+planned unavailable+ emergent work+unplanned unavailable)]/[Gross available man hrs+unplanned overtime hrs]

Indirect Work=
  Sum of actual hrs for indirect work "IM's" (excluding foremen's time)/Gross available manpower hrs (excluding foremen's time)

CM Hrs=
  Actual hrs charged against scheduled "CM" WO's/Total actual hrs charged (planned+emergent)

PM Hrs=
  Actual hrs charged against scheduled "PM" WO's/Total actual hours charged (planned+emergent)

PR Hrs=(Proactive hours)
  Actual hrs charged against scheduled "PR" WO's/Total actual hrs charged (planned+emergent)

CD Hrs=(Condition Directive)
  Actual hrs charged against scheduled "CD" WO's/Total actual hrs charged (planned+emergent)

SA Hrs=
  Actual hrs charged against scheduled SA WO's/Total actual hrs charged (planned+emergent)

EN Hrs=
  Actual hrs charged against scheduled EN WO's/Total actual hrs charged (planned+emergent)

Sponsored Hrs=
  Total hrs charged against Sponsored work/Total actual hrs charged (planned+emergent)

Emergency Hrs=
  Total hrs charged against Emergency work/Total actual hrs charged (planned+emergent)

Sch. Compliance WO#=
  Work orders completed (Prog=C)/Work orders scheduled

Sch. Compliance Hrs=
  Completed actual hrs (Prog=C)/Scheduled hrs for scheduled activities Planning Effectiveness=
  1−[Absolute value of (scheduled−actual hrs)/Scheduled hrs (Prog=C)]

WO Completed w/out Hours=
  Total number of completed jobs (Prog=C) with no actual hrs 3.2 Trends:

To access trends, click on the desired leading metric (this builds a trend chart for that metric). Or use Management Reports, Front Page To add additional metrics, change date range and/or crew select 'Report' from the file menu bar located top left of the screen and select:
  Range—allows the desired date range to be selected
  10 week (default)
  1 year
  Custom Date Range
  Content—allows the desired crews and metrics to be selected
  Crews: choose one or several crews using the shift or control keys or select the all button at the bottom right to select all crews.
  Content: choose as many metrics as required (one to all). All metrics are weighted numbers; the raw numbers are used for calculations.

4. Right Click Menus 4.1 Right Clicks for the Work Week Assignment Tool

Below are the menu items associated with 'right clicks' on the Work Week Assignment grids. The user needs to left click on a row and then right click on that record (This ensures that the desired record is selected). Once the user right clicks the record it will be highlighted.

Note: If the record does not highlight, then left click on it again. Once highlighted, right click again.

Assign Planner . . . .

Choose the initials of the person assigned to the record. If no one was previously assigned, the record will change from light red to yellow.

Planning Complete & Planning not Complete

Planning complete changes the record from yellow to green & planning not complete revises the green to yellow.

Note: This indicates that all the planning has taken place, i.e. all materials, parts, craft and venders coordination. If you right click on a green record the user has the option to set the record to "Planning not Complete".

Move to . . . .
Allows a record to be moved to another week and/or crew.
Copy to . . . .
Allows a record to be left where it is and be copied to another week and/or crew.
Note: Records cannot be moved from T0, only copied.
Delete
This will remove the record from PaSTA.
Note: This should only be used if you have copied a record and did not intend to or if you no longer want to see the record in PaSTA. If a record is deleted by accident you will have to go the system used to create and track work tasks and reschedule the work order and update PaSTA, this will bring the work order back into PaSTA. A message will display if you try to delete the last instance of that record. You will be prompted to continue or not.
WO View . . . .
This will display all jobs with the same work order number, regardless of whether it's scheduled or not or been assigned to a crew. The user can select the record and click on the SEEK, lower left corner, and the user will be taken to where the WO is scheduled/unscheduled.
Sort . . . .
Allows the data to be sorted in one to three different columns in ascending or descending order.

4.2 Work Week Assignment Tool: Scroll Bars
The right click menu for the scroll bars is as follows:
Scroll Here:
Moves the scroll bar to where you right clicked
Page Left:
Moves the scroll bar one step to the left
Page Right:
Move the scroll bar one step to the right
Scroll Left & Scroll Right:
Moves the scroll bar to the left or right 4.3 Right click: Work Week Management Form
Set Emergent Code
This allows the user to set the emergent code:
E—emergency work
S—sponsored work
None—moves work from the emergent section to the planned section
Note: The 'None' code is used only if there is a scheduling mistake. (i.e. In T0 a record was deleted from the planned section and had to be reinstated. It could only be rescheduled as emergent work. This would allow the record to be placed back into the planned area.)
Unscheduled
Takes the selected record and places it back on the unscheduled side of the Work Week Assignment Tool.
Note: If a record is already unscheduled, a message will be displayed that the work is already unscheduled. This indicates that it would be ok to delete the record from the Work Week Management Form.
Rollover
This allows the user to 'roll' work out of T0 into a future week.
Note: Work important enough to work this week should be moved to the next week, barring any parts or material issues. This function is the same as the 'copy to . . . ' function. The record will remain in T0 and will be exported to the desired week and an R will be placed in the Prog column.

4.4 Right Click: WO View and Find
This will allow the user to 'Copy To . . . ', 'Move To . . . ' and 'Sort . . . ' the current result sets.

5. Drop Down Menus
5.1 File
Find, Print Preview . . . , Print and Close
Find
This allows the user to search the entire PaSTA database using the flowing criteria:
WO ID (work order number): This will find all records with the same work order number.
WO Description: This will find all records that contain what you type in the desertion
Asset Name This will find all records with the asset name the user enters.
Misc
This will find any open work orders that are two weeks or older inside of PaSTA. (e.g. a work order that was scheduled three months ago but was never worked)
Results of Find and Misc
The result of the find feature returns the following screen. From here the user can filter, move, copy and sort by using the right click features (page 18)
Print Preview
This will allow the user to view the print job before sending to the printer
Print
This will send the job to the printer directly.
Note: Once the job is sent to the printer, the user can continue to use PaSTA. Just click back on the PaSTA screen and continue to work.

5.2 View
Setting and Refresh
Setting
The default setting is to load all grids automatically. (A grid is any area inside of PaSTA that contains records) If users only want to load certain grids on demand uncheck the box in 'settings'. When this is unchecked the grids on the work week assignment form will appear blank. When the user clicks on the 'lighting bolt' next to that grid, that grid will be loaded only. This is useful in speeding up the load time of the screen, if there are large amount so records in the girds. (This is only available on the work week assignment form.)
Refresh
This will force all the grids to be reloaded and calculation to be recalculated. This only needs to be done if it appears that a action taken by the user did not happen. Additionally the user can refresh one grid at a time by pressing the 'lighting bolt' icon next to that grid.

Three levels of users are distinguished.
Level One Users are those who only require to view and print out PaSTA schedule.
Level one user can view and print the following:
1. Work week management tool
2. Work week management form
3. Management reports
Level one user does not have access to the right click menus and are unable to schedule or edit records on either the work week management tool or work week management form. Level one users also do not have access to the administration section nor the primavera export. All other actions are available to level one user.
Level two users have all the permissions of level one users in addition to level three users on the work week management form.
Level three users are administrators and have full access. In particular, level three users can add users by clicking on the plus and subtract users by highlighting a record and clicking on the minus.

In particular, the three levels can do the following:

Level Three:

Read/write on the work week assignment form and work week management tool

Update PaSTA

Update

Right click menus on both forms

Level Two:

Read on work week assignment form

Read/write on the work week management tool

Right click menus on the work week assignment form

Level One:

Read both forms

Print from both forms

Note: The Administrator box should only be checked when adding additional PaSTA administrators. (See administrator below)

Crews and workers can be manually added, or they can be updated automatically from EMPAC. The same is true for resources.

While a preferred embodiment has been set forth above, those skilled in the art who have reviewed the present disclosure will readily appreciate that other embodiments can be realized within the scope of the invention. For example, platforms other than those disclosed can be used. Also, elements of the user interfaces can be rearranged. Therefore, the present invention should be construed as limited only by the appended claims.

What is claimed is:

1. A planning and scheduling system running on a computing device, the system comprising:
   a user interface; and
   a computing device in communication with said user interface, said computing device being programmed to implement:
   work week sections;
   a scheduled job section;
   an unscheduled job section;
   a short notice outage section;
   a planned outage section; and
   work orders, wherein the work orders can be moved from one work week section to another work week section, from unscheduled to scheduled, to short notice outage, to planned outage, and to backlog, by dragging and dropping the work orders using said user interface.

2. The system of claim 1, wherein the scheduled job section and unscheduled job section are simultaneously displayed to a user.

3. The system of claim 1, wherein when work orders are dropped into a work week section, real time indication of resource loading is determined.

4. The system of claim 3, wherein the resource loading is determined based on whether a work group has been over loaded overloaded with too much work.

5. The system of claim 1, wherein the computing device is programmed to implement color coding, and wherein said color coding indicates the status of planning the work order.

6. The system of claim 5, wherein the status includes whether the work order is complete and ready to work.

7. The system of claim 5, wherein user defined rules control the color coding.

8. The system of claim 1, wherein the system runs on computing device is a networked computer in communication with a database server.

9. The system of claim 1, further comprising a wherein said computing device is programmed to control said user interface for displaying the work week sections, scheduled job section, unscheduled job section, short notice outage, planned outage, and work orders.

10. The system of claim 1, wherein the system computing device is programmed to be used for scheduling and planning.

11. The system of claim 1, further comprising a management control for executing the work week sections.

12. The system of claim 1, wherein the sections are user configurable to display data that the user requires in a manner permitting the user to accomplish planning and scheduling.

13. The system of claim 12, wherein the sections are user configurable through user configurations that are made available to all other users.

14. The system of claim 1, wherein the work orders can be inserted into a time disconnected work week schedule preparatory to being assigned to a fixed schedule when an opportunity occurs.

15. The system of claim 1, wherein the computing device is programmed to allow users to print contents utilizing filters on the work order data.

16. The system of claim 1, wherein a display is provided for a supervisor of the work executing resources for managing the work week.

17. The system of claim 16, wherein a section is provided for the assignment of specific resources to each work order scheduled for that work week on a specific day and time.

18. The system of claim 16, wherein a section is provided to track emergent work occurring during the work week that was unknown prior to schedule lock down, and wherein the emergent work includes sponsored and emergency work.

19. The system of claim 16, wherein performance indicators and metrics are calculated and trended for interpretation of the success of the execution of the work week.

20. The system of claim 16, wherein all unavailable resource time is identified whether personnel vacation, holiday, sick, training, etc. or equipment resource unavailability.

* * * * *

UNITED STATES PATENT AND TRADEMARK OFFICE
CERTIFICATE OF CORRECTION

PATENT NO. : 8,209,205 B1
APPLICATION NO. : 10/851663
DATED : June 26, 2012
INVENTOR(S) : John W. McElroy, Sean P. McElroy and Kirk Samsel Page 1 of 1

It is certified that error appears in the above-identified patent and that said Letters Patent is hereby corrected as shown below:

In the claims

In column 14, lines 2-3, Claim 4, remove -- over loaded --.

In column 14, line 12, Claim 8, insert -- a -- before "computing device.".

In column 14, line 12, Claim 8, delete "is" and insert -- on --.

In column 14, line 14, Claim 9, remove -- further comprising a --.

Signed and Sealed this
Fifth Day of April, 2016

Michelle K. Lee
*Director of the United States Patent and Trademark Office*